A. E. IVERSON.
IRRIGATION SYSTEM.
APPLICATION FILED FEB. 7, 1920.
1,373,660.
Patented Apr. 5, 1921.
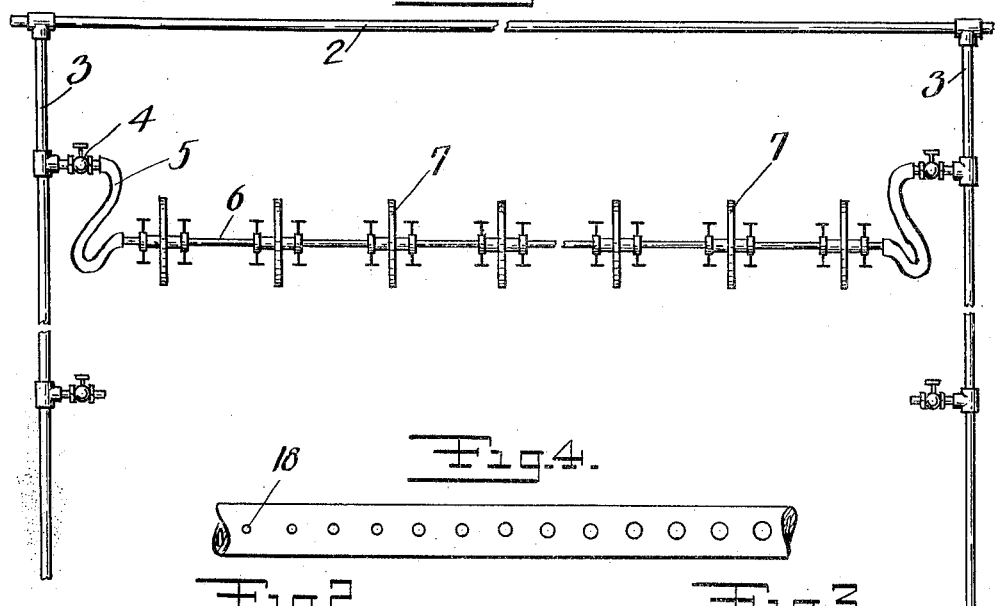
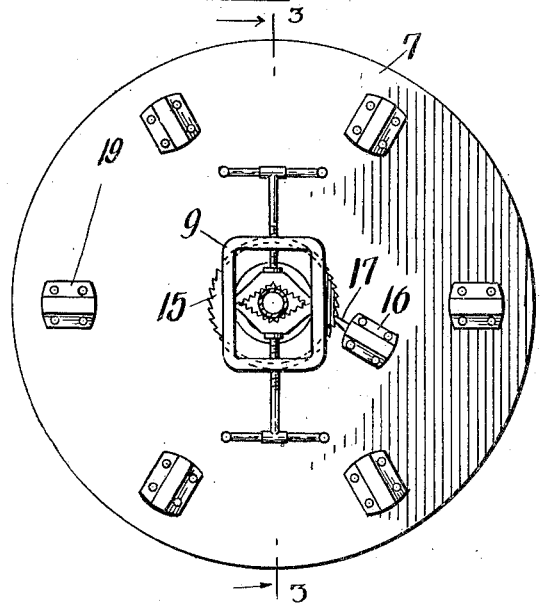
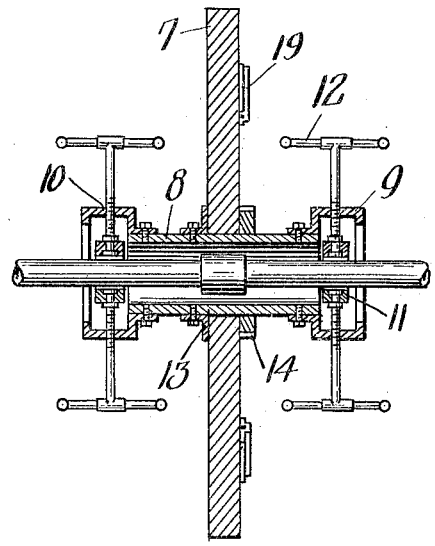
Inventor
AARON E. IVERSON.
By his Attorney:
Wm. Wallace White

UNITED STATES PATENT OFFICE.

AARON E. IVERSON, OF CHATSWORTH, CALIFORNIA.

IRRIGATION SYSTEM.

1,373,660.  Specification of Letters Patent.  Patented Apr. 5, 1921.

Application filed February 7, 1920. Serial No. 356,830.

*To all whom it may concern:*

Be it known that I, AARON E. IVERSON, a citizen of the United States, residing at Chatsworth, California, have invented new and useful Improvements in Irrigation Systems, of which the following is a specification.

This invention relates to improvements in irrigation systems, the object of the invention being to provide a system by means of which the distributing pipe or pipes may be supported on wheels or rollers and adapted to be rolled from place to place over the field to be irrigated, the distributing pipe being so connected with its wheels that rotation of the pipe in one direction will cause the rotation of the wheels, but the pipe may be rotated in the opposite direction while the wheels remain stationary.

A further object of the invention is to provide an extremely simple and efficient means for evenly distributing the water along the length of the distributing pipe.

With the foregoing and other objects in view which will appear as the description proceeds, the invention consists in the novel features of construction and combination of parts which will be more fully described hereinafter, and particularly pointed out in the claims.

In the drawings accompanying and forming part of this specification,

Figure 1 is a fragmentary plan view illustrating the distributing pipe mounted according to the present invention;

Fig. 2 is a side elevation of one of the wheels, showing the manner in which the same is secured to the pipe for rotation therewith, the pipe being shown in section;

Fig. 3 is a sectional view taken approximately on the line 3—3 of Fig. 2.

Fig. 4 is a fragmentary side view of the distributing pipe showing the gradually increasing diameter of the distributing openings therein.

The same characters of reference designate the same parts in the different figures of the drawing.

Referring to the drawing, 2, designates a supply pipe which may be laid along one side of the field to be irrigated, said pipe being connected with some suitable source of water supply under pressure. The pipe, 2, may be placed in communication with branch pipe 3 at right angles thereto, the branch pipe being provided at predetermined distances apart with valve controlled outlets 4, having a suitable connection for a flexible hose 5, the opposite end of the hose being adapted to be connected to the end of delivery pipe 6, as shown in Fig. 1. It will be understood, of course, that the branch pipes 3 may be placed either at one side only of the field, or at both sides thereof, as illustrated in Fig. 1.

The delivery pipe 6, is supported at suitable intervals along its length by wheels or rollers 7, in order to permit the delivery pipe to be rolled from place to place over the field to be irrigated. The preferred manner of mounting the wheels on the pipe is shown in Figs. 2 and 3, wherein 8 designates a sleeve which is adapted to fit around the pipe and the inside diameter of which is such that there is considerable space between the pipe and the inside of the sleeve. At each end of the sleeve is secured a boxing member 9, provided at diametrically opposite points with threaded openings adapted to receive the threaded stems 10 of a pair of pipe holding members which are in the nature of pipe wrenches. Each of the stems 10 is provided at its outer end with a crossbar 12, forming a handle, which handles serve the double purpose of clamping the delivery pipe within the sleeve, and rotating the pipe so as to cause the wheels to roll over the ground. The wheels are carried by the sleeves 8 in such a manner that, when the sleeves are rotated in one direction the wheels are also caused to rotate, but when the sleeves are rotated in the opposite direction the sleeves remain stationary. This is accomplished in the present instance by mounting the wheels on the sleeves between a pair of collars 13 and 14 respectively. One of said collars, as for instance the collar 14, may be permanently secured to or formed integral with the sleeve, while the other collar, as for instance the collar 13, may be removably secured thereto, as shown in Fig. 3. The central opening in the wheel 7 surrounding the sleeve 8 is of sufficient size to permit the wheel to rotate independently of the sleeve. For causing the rotation of the wheels when the pipe is rotated in one direction, the collar 14 is provided around its periphery with ratchet teeth, as shown in Fig. 2, and carried by the wheel 7 is a bracket 16 in which is mounted a spring-pressed pawl 17, adapted to engage the ratchet teeth carried by the collar 14. It will thus be seen that when the pipe 6 is clamped between the jaws of the holding members and the sleeve rotated in one direction, the engagement of the pawl with the ratchet teeth of the collar will cause the wheel to be rotated, but when the sleeve is rotated in the opposite direction the pawl will slide over the teeth and permit the sleeves to be rotated without rotation of the wheels.

In the present instance I have shown an extremely simple means for causing an even distribution of the water throughout the length of the delivery pipe 6, which means comprises a series of openings 18 of gradually increasing diameter, as the distance from the inlet of the delivery pipe increases. This graduation of the diameter of the opening is clearly illustrated in Fig. 4. It will be understood, of course, that when both ends of the delivery pipe are to be connected to the source of supply, as shown in Fig. 1, the openings will be small at both ends of the pipe and will gradually increase in diameter as they approach the middle of the length of the pipe, while if the pipe is to be supplied only at one end thereof, the opening will be small at that end and gradually increase in size as they approach the opposite end of the pipe. As a substitute for openings gradually increasing in diameter, as the distance from the inlet end of the pipe increases, it will be obvious that the pipe itself might be tapered and openings of uniform diameter formed therein, and I have not deemed it necessary to illustrate herein this obvious equivalent. In Fig. 2 I have shown a plurality of brackets 19 at one side of the wheels equally spaced apart at a short distance from the periphery of the wheels. These brackets are merely for permitting a lever to be inserted therein to assist in rotating the wheels when such additional leverage is required.

From the foregoing it will be seen that I have provided a system of irrigation whereby the distributing pipe can be rolled over the field and stopped at any desired point, and that when the pipe has arrived at the desired point, should the discharge openings not be in position to cause the water to flow in the proper direction, it will be necessary to merely take hold of the handles 12 of the pipe clamping members 10, and rotate the pipe backward until the openings are properly directed, the wheels 7 remaining stationary during such backward rotation.

While I have described the structure herein illustrated in detail, it is to be understood that I do not thereby limit my invention to the precise features of construction shown, as I am aware that many mechanical changes and modifications may be made therein without departing from the spirit and scope of the invention as set forth in the claims appended hereto.

It will also be understood, of course, that while, for the sake of convenience, I have described my invention as an irrigation system, it is equally applicable to a spraying system, or any system in which it is desirable that a distributing pipe be moved from place to place, and have its discharge openings pointing in any desired direction.

Having thus described my invention, what I claim is:

1. An irrigation system, comprising a delivery pipe, a plurality of supporting members mounted for rotation on said pipe, and means for locking said supporting members to said pipe for rotation therewith in one direction.

2. An irrigation system, including a delivery pipe, rotatable supporting means carried by said pipe, means for rotating the pipe, and means for locking said supporting members to said pipe for rotation therewith in one direction while permitting independent rotation in the opposite direction.

3. An irrigation system, including a delivery pipe, means for supporting said pipe for rotation over the field to be irrigated, and a pawl and ratchet mechanism between said pipe and supporting means for rotating said supporting means with said pipe in one direction and permitting the pipe to be rotated in the opposite direction independently of said supporting means;

4. An irrigation system, including a delivery pipe provided with discharge openings of gradually increasing diameter as the distance from the inlet of the pipe increases, rotatable supporting means carried by said pipe for rotation over the field to be irrigated, and a pawl and ratchet mechanism between said pipe and supporting means, said pawl and ratchet mechanism constituting means for permitting the pipe to be rotated independently of said supporting means in one direction.

5. An irrigation system, including a delivery pipe, a plurality of sleeves adapted to be removably secured to said pipe, each of said sleeves having a wheel mounted for rotation thereon, and coöperating means carried by the wheels and sleeves for causing rotation of the wheels when the sleeves are rotated in one direction.

6. An irrigation system, including a delivery pipe adapted to evenly distribute a liquid along its length, a plurality of sleeves adapted to encircle said pipe, clamping means carried at each end of the sleeve for engagement with said pipe, wheels mounted for rotation on said sleeves, and pawl and ratchet mechanism between the sleeves and wheels for causing rotation of the wheels when the sleeves are rotated in one direction.

In testimony whereof I have signed my name to this specification.

AARON E. IVERSON.